E. WIARD.

Plows.

No. 5,941. Reissued June 30, 1874.

Witnesses.
James Martin Jr.
J. N. Campbell

Inventor:
Edward Wiard
by his attys
Mason Fenwick & Lawrence

AM. PHOTO-LITHOGRAPHIC Co. N. Y. (OSBORNE'S PROCESS.)

UNITED STATES PATENT OFFICE.

EDWARD WIARD, OF LOUISVILLE, KENTUCKY, ASSIGNOR TO BENJAMIN F. AVERY, OF SAME PLACE.

IMPROVEMENT IN PLOWS.

Specification forming part of Letters Patent No. 90,475, dated May 25, 1869; reissue No. 5,941, dated June 30, 1874; application filed April 2, 1874.

*To all whom it may concern:*

Be it known that I, EDWARD WIARD, of Louisville, in the county of Jefferson and State of Kentucky, have invented a new and useful Improvement in Plows; and I do hereby declare that the following is a full, clear, and exact description thereof, which will enable others skilled in the art to make and use the same, reference being had to the accompanying drawings, forming part of this specification, in which—

Figure 1:
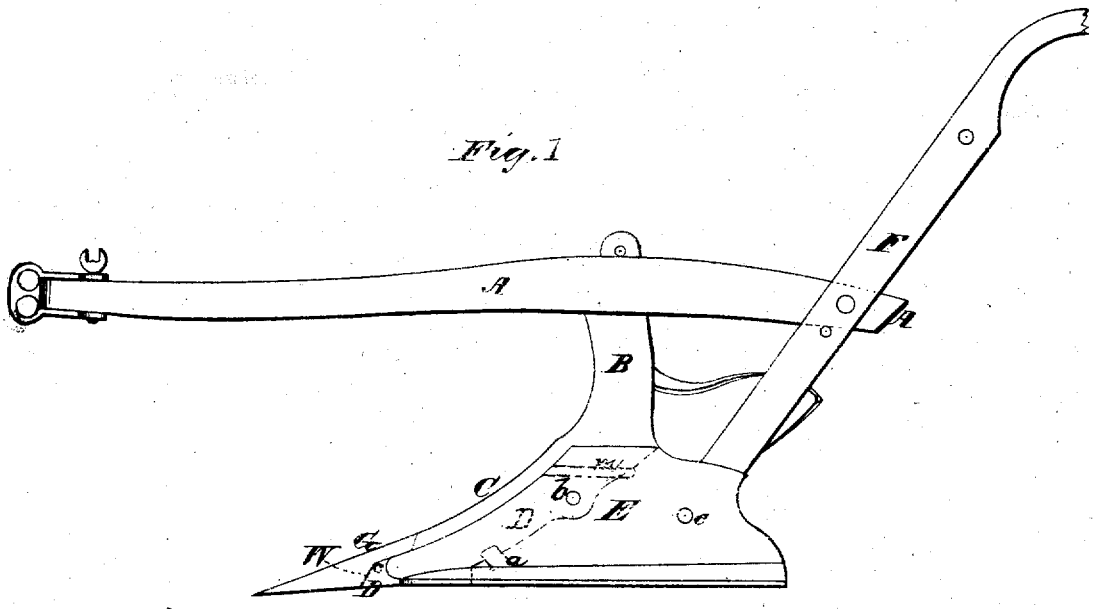
Figure 2:
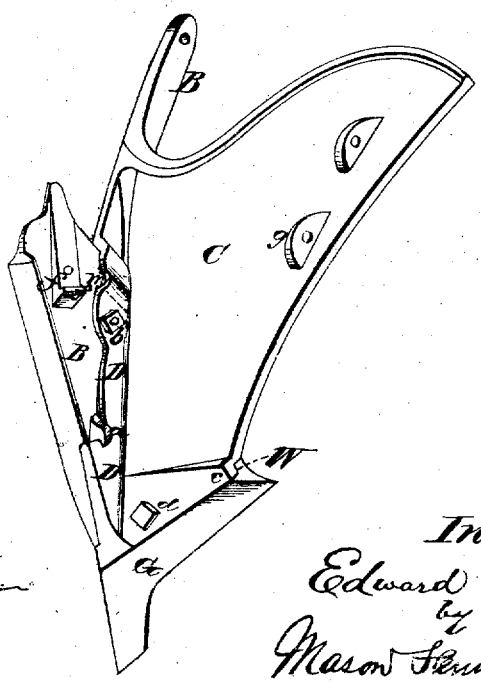

Figure 1 represents a side view of my improved plow, and Fig. 2 is a perspective view of the plowshare.

Similar letters of reference indicate corresponding parts.

This invention relates to an improved plow in which the share is composed of three parts, in such manner that if any one of the parts becomes destroyed, by wear or otherwise, it can be readily replaced without requiring the whole share to be renewed. The invention consists chiefly in forming a standard and land-side support on the mold-board of the plow, so that the land-side can, by means of but one bolt, be securely fastened to the same. This invention also consists in forming a longitudinal recess on the under side of the detachable land-side proper, and a projecting rib on the short land-side of the mold-board, whereby the fastening-bolt is assisted in holding the land-side in place, and at the same time the surface of the land-side can be flush with the land-side surface of the mold-board and standard. It further consists in a standard, mold-board, and a recessed land-side support made in one piece, in combination with the land-side proper, a hook, and a bolt. It further consists in the combination of the rib, the recess, the hook, and the bolt with the parts of the plow, as described.

Figure 3:
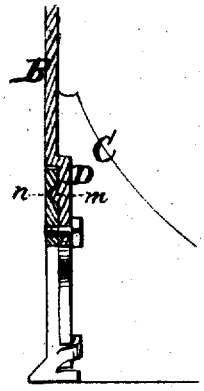

A in the drawing represents a plow-beam of suitable kind. B is the plow-standard. It is cast with the mold-board C, and a flange or short land-side, D, upon it, as is clearly shown in Fig. 2. The standard and mold-board are braced by the flange D, which is deflected inward from the base of the land-side edge of the mold-board, and also from said edge of the standard, to allow the land-side E to be placed upon it with its face flush with the land-side surface of the mold-board and standard, as indicated in Fig. 3. On the outer side of the flange or inner land-side D, a rib, *m*, is formed, and in the inner side of the land-side proper a corresponding recess, *n*, is provided to receive this rib, as shown in Fig. 3. This rib and recess connection serves to hold the land-side from any upward or downward movement, and thereby relieve the other fastenings from undue strain. *a* is a hook formed on the land-side E, and which catches over the edge of the flange or support D, as shown in Fig. 2. By the use of this hook the fastening of the land-side is simplified, so that but one bolt or screw, *b* is required to secure it to the inner short land-side or flange D. W is an angular recess or rabbet formed in the under side of and at the rear end of the plow-point G. *c* is a rib projecting from the mold-board, upon which the notched portion of the point G fits. *d* is a bolt for securing the point G firmly to the other parts. One of the handles F is fastened to the land-side by a bolt, *e*, and rests on a step, *f*, formed thereon, while the other or mold-board handle is secured to lugs *g g*, formed on the under side of the mold-board. A brace may be put between the mold-board and land-side, by being fitted with one end in a socket formed on the mold-board, while the other end is placed at the end of a groove or trough formed on the land-side, and locked by the end of the handle F in its rear. The short land-side or flange D can be readily cast upon the mold-board and standard in a simple two-part flask, by giving it a slight taper, which will permit it to be readily withdrawn from the sand.

Having thus described my invention, what I claim as new, and desire to secure by Letters Patent, is—

1. The combination, with the standard, mold-board, and the inward-deflected support D, extending from the back to and beyond the front end of the land-side edge of the mold-board, and the land-side, constructed as described, of the hook *a* and bolt *b*, as and for the purpose set forth.

2. The rib *m* on the flange or inner land-side of the mold-board and standard, in combination with the land-side E proper, having the recess *n* in it, and bolt *b*, substantially as described.

3. The combination, with the standard B, mold-board C, inward-deflected support D, extending from the back to and beyond the front end of the land-side edge of the mold-board, the land-side E, and the point G, constructed as described, of the hook *a* and bolt *b*, as and for the purpose set forth.

4. The combination of the hook *a*, rib *m*, recess *n*, and bolt *b* with the parts of the plow, as herein described, and for the purpose set forth.

EDWARD WIARD.

Witnesses:
SAML. J. LOOK,
CHAS. L. PIPER.